United States Patent Office 3,144,457
Patented Aug. 11, 1964

---

3,144,457
N-(2-PHTHALIMIDOETHYL) QUATERNARY AMMONIUM SALTS OF TRIETHYLENEDIAMINE
Robert B. Moffett, Kalamazoo, Mich., assignor to The Upjohn Company, Kalamazoo, Mich., a corporation of Delaware
No Drawing. Filed Dec. 20, 1963, Ser. No. 332,248
3 Claims. (Cl. 260—268)

This invention relates to novel quaternary ammonium salts of triethylenediamine and to processes for their preparation and is more particularly concerned with N-(2-phthalimidoethyl) quaternary ammonium salts of triethylenediamine and the N-oxides and acid addition salts thereof and with processes for their preparation.

The compounds of the invention can be represented by the following formula:

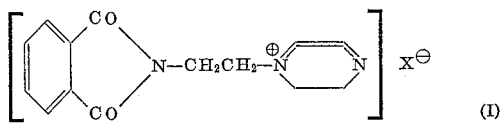

wherein X is the anion of a pharmacologically acceptable acid. The compounds of the invention also include the acid addition salts of the free bases of Formula I with pharmacologically acceptable acids, and the N-oxides of the compounds of Formula I and the acid addition salts of said N-oxides with pharmacologically acceptable acids.

The term "pharmacologically acceptable acids" is well recognized in the art and is inclusive of acids such as sulfuric, hydrochloric, hydrobromic, hydriodic, nitric, phosphoric, lactic, benzoic, methanesulfonic, p-toluenesulfonic, salicylic, acetic, propionic, maleic, malic, tartaric, citric, cyclohexylsulfamic, succinic, nicotinic, ascorbic acids and the like.

The novel compounds of the invention, i.e., the compounds of Formula I above, the N-oxides of compounds of Formula I, and the acid addition salts of the compounds of Formula I and the N-oxides thereof with pharmacologically acceptable acids, possess pharmacological activity. Illustratively the compounds of the invention show antibacterial activity, ganglionic blocking activity, and central nervous system depressant activity. The antibacterial activity of the compounds of the invention renders them valuable for the control of bacterial organisms, both systemically and topically in mammals, and also for sterilization purposes, for example in the sterilization of surgical instruments and in related fields.

For purposes of administration to mammals, including animals of economic value, the novel compounds of the invention can be combined with solid and liquid pharmaceutical carriers and formulated in the form of tablets, powder packets, capsules and like solid dosage forms using starch and like excipients, or dissolved or suspended in suitable solvents or vehicles for oral or parenteral administration.

The novel compounds of the invention can be prepared conveniently by reacting triethylenediamine with the appropriate halide

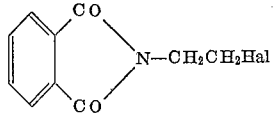

wherein Hal represents a halogen atom, preferably bromine or chlorine. The reaction is carried out advantageously in the presence of an inert solvent, for example an alkanone such as acetone, methyl ethyl ketone, methyl isopropyl ketone and the like, or an alkanol such as methanol, ethanol, butyl alcohol and the like. Advantageously the triethylenediamine is present in at least equimolar proportions with respect to the halide and preferably the triethylenediamine is present in excess of equimolar proportions.

The reaction is generally conducted at a temperature of the order of 20 to 30° C. although higher or lower temperatures can be employed if desired. Generally speaking the required product separates from solution and is isolated by filtration. If desired the compound so obtained can be purified by conventional procedures, for example by recrystallization.

The anion of the quaternary ammonium salts obtained as described above can be exchanged for any other desired anion, for example, the anions of other pharmacologically acceptable acids, by conventional procedures. For example, any of the quaternary ammonium salts of the invention can be converted to the corresponding quaternary ammonium hydroxide, illustratively by treatment with silver oxide, and the hydroxide so obtained is reacted with the appropriate acid to obtain the desired quaternary ammonium salt.

The acid addition salts of the compounds of Formula I above can be prepared by reacting the compound of Formula I with a pharmacologically acceptable acid in the presence of an inert solvent such as water, ether, and lower alkanols such as methanol, ethanol and the like.

The N-oxide compounds of the invention can be prepared by methods well known in the art, for example, by reacting the free base of the Formula I with an oxidizing agent such as hydrogen peroxide, peracetic acid, Caro's acid, and the like. Advantageously, the reaction is carried out at ordinary temperatures (e.g., of the order of 20 to 30° C.) in the presence of an inert solvent such as benzene, chloroform, lower-alkyl alkanoates such as ethyl acetate, and lower alkanols such as methanol, ethanol, isopropyl alcohol, and the like. Suitably the oxidizing agent is employed in at least stoichiometric proportion with respect to the free base (I) and preferably the oxidizing agent is present in a slight excess. When the reaction has been completed, any excess of oxidizing agent can be removed by treating the reaction mixture with an agent such as platinum, palladium, Raney nickel, and inorganic hydrosulfites, such as sodium hydrosulfite, and the like.

The N-oxides of the invention can also be prepared by reacting the mono N-oxide of triethylenediamine with an approximately equimolar proportion of the appropriate N-(2-haloethyl)phthalimide using the conditions described above for the preparation of the quaternary ammonium salts of the invention.

The N-oxide acid addition salts of the invention can be prepared from the corresponding N-oxide and a pharmacologically acceptable acid using the procedures hereinbefore described for the preparation of the acid addition salts of the compounds (I).

For the sake of simplicity the well known trivial name triethylenediamine is employed herein. For indexing purposes Chemical Abstracts employs the systematic name 1,4-diazabicyclo[2.2.2]octane for this diamine. The system of nomenclature used in naming the novel quaternary ammonium salts of this invention is consistent with Chemical Abstracts practice.

The following examples illustrate the best method contemplated by the inventor for carrying out his invention.

*Example 1.—1-(2-Phthalimidoethyl)-4-Aza-1-Azoniabicyclo[2.2.2]Octane Bromide*

To a solution of 44.8 g. (0.4 mole) of triethylenediamine in 100 ml. of methanol was added slowly, with stirring during 1 hr., a solution of 50.8 g. (0.2 mole) of N-(2-bromoethyl)phthalimide in 300 ml. of methyl ethyl ketone. The resulting mixture was stirred for a further 1 hr. after the addition was complete and was then allowed to stand for 2 days. The solid which had separated was isolated by filtration, washed with ether, and dried. There was thus obtained 41.3 g. of 1-(2-phthalimidoethyl) - 4 - aza - 1 - azoniabicyclo[2.2.2]octane bromide in the form of a hydrate having a melting point of 304° C. (decomposition). This product was recrystallized from 325 ml. of methanol to give 26.2 g. of crystalline material having a melting point of 306° C. (decomposition).

*Analysis.*—Calcd. for $C_{16}H_{20}BrN_3O_2 \cdot H_2O$: C, 50.01; H, 5.77; N, 10.94; Br, 20.80. Found: C, 50.07; H, 5.88; N, 10.85; Br, 20.83.

Using the above procedure, but replacing N-(2-bromomethyl)phthalimide by N-(2-chloroethyl)phthalimide, there can be obtained 1-(2-phthalimidoethyl)-4-aza-1-azoniabicyclo[2.2.2]octane chloride.

*Example 2.—1-(2-Phthalimidoethyl)-4-Aza-1-Azoniabicyclo[2.2.2]Octane Chloride*

The above compound can be prepared as follows: A solution of 1 - (2-phthalimidoethyl)-4-aza-1-azoniabicyclo[2.2.2]octane bromide in water is shaken with a suspension of silver oxide until the precipitation of silver bromide is complete. The resulting mixture is filtered and the filtrate containing the corresponding quaternary ammonium hydroxide is neutralized by the addition of aqueous hydrochloric acid. The resulting mixture is evaporated to dryness. There can thus be obtained 1-(2 - phthalimidoethyl) - 4 - aza - 1 - azoniabicyclo[2.2.2]octane chloride.

Similarly, using the above procedure but replacing hydrochloric acid by other acids such as hydriodic, sulfuric, phosphoric, acetic, methanesulfonic and like acids, there are obtained the corresponding quaternary ammonium salts. By using an excess of acid in the neutralization there can be obtained the desired quaternary ammonium salt in the form of the corresponding acid addition salt.

*Example 3.—1-(2-Phthalimidoethyl)-4-Aza-1-Azoniabicyclo[2.2.2]Octane N-Oxide Bromide*

The above compound can be prepared as follows: To a solution of 1 g. of 1-(2-phthalimidoethyl)-4-aza-1-azoniabicyclo[2.2.2]octane bromide in 50 ml. of absolute ethanol is added an equimolar quantity of 30% hydrogen peroxide. The mixture is allowed to stand for 4 days at room temperature, at the end of which time the mixture is shaken with 0.5 g. of finely divided platinum until a test for peroxide is negative. The mixture is then filtered and the filtrate is evaporated to dryness under reduced pressure. There can thus be obtained 1-(2-phthalimidoethyl) - 4 - aza - 1 - azoniabicyclo[2.2.2]octane N-oxide bromide.

Similarly, using the above procedure, other 1-(2-phthalimidoethyl) - 4 - aza - 1 - azoniabicyclo[2.2.2]octane quaternary ammonium salts can be converted to the corresponding N-oxides and these N-oxides can be converted to the corresponding acid addition salts thereof.

*Example 4.—1-(2-Phthalimidoethyl)-4-Aza-1-Azoniabicyclo[2.2.2]Octane N-Oxide Bromide*

The above compound can be prepared as follows: To a solution of 22.4 g. (0.2 mole) of triethylenediamine in 400 ml. of absolute ethanol is added, with stirring during 15 min., 100 ml. of 30% aqueous hydrogen peroxide. After allowing the resulting mixture to stand at approximately 20° C. for 4 days the excess hydrogen peroxide is destroyed by cautiously adding an aqueous slurry of 0.5 g. of 30% platinum on charcoal. The mixture so obtained is stirred vigorously for 4 hrs. and then filtered through a filter aid. The filtrate is cooled to 3° C. and a solution of 53.34 g. (0.21 mole) of N-(2-bromoethyl)phthalimide in methanol is added. The mixture is allowed to stand overnight before being concentrated and filtered. The filtrate is diluted with ether and the solid which separates is isolated by filtration, washed with ether and dried. There can thus be obtained 1 - (2-phthalimidoethyl)-4-aza-1-azoniabicyclo[2.2.2]octane N-oxide bromide.

I claim:

1. A compound selected from the class consisting of (*a*) quaternary ammonium salts of triethylenediamine having the formula:

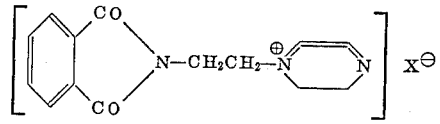

wherein X is the anion of a pharmacologically acceptable acid, and (*b*) the acid addition salts of the above quaternary ammonium salts with pharmacologically acceptable acids.

2. 1 - (2 - phthalimidoethyl) - 4 - aza - 1 - azoniabicyclo[2.2.2]octane bromide.

3. A compound selected from the class consisting of (*a*) N-oxides having the formula:

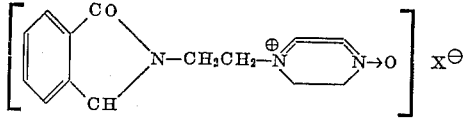

wherein X is the anion of a pharmacologically acceptable acid, and (*b*) the acid addition salts of the above N-oxides with pharamacologically acceptable acids.

No references cited.